US008522149B2

(12) United States Patent
Lloyd et al.

(10) Patent No.: US 8,522,149 B2
(45) Date of Patent: Aug. 27, 2013

(54) SYSTEM AND METHOD TO VISUALLY PRESENT ASSETS AND ACCESS PLATFORMS FOR THE ASSETS

(75) Inventors: Heather Lloyd, Croton Falls, NY (US); Daniel Malee, Wheaton, IL (US); Satish Baratam, Croton Falls, IL (US); Charles Boland, Croton Falls, IL (US); Eric Hedgecock, Walnut Creek, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 511 days.

(21) Appl. No.: 12/399,472

(22) Filed: Mar. 6, 2009

(65) Prior Publication Data

US 2010/0229123 A1     Sep. 9, 2010

(51) Int. Cl.
 *G06F 3/00* (2006.01)
 *G06F 3/048* (2006.01)
 *H04N 7/16* (2011.01)
 *G06Q 30/00* (2012.01)

(52) U.S. Cl.
 USPC ......... 715/748; 715/826; 725/153; 705/14.51

(58) Field of Classification Search
 USPC ............... 715/748, 826; 725/153; 705/14.51
 See application file for complete search history.

(56) References Cited

U.S. PATENT DOCUMENTS

| | | | |
|---|---|---|---|
| 7,580,861 B1* | 8/2009 | Song | 705/26.35 |
| 2004/0006517 A1* | 1/2004 | Takatori | 705/26 |
| 2005/0125405 A1* | 6/2005 | Watson et al. | 707/7 |
| 2006/0020904 A1* | 1/2006 | Aaltonen et al. | 715/850 |
| 2007/0100755 A1* | 5/2007 | Kragt et al. | 705/51 |
| 2007/0156521 A1 | 7/2007 | Yates | |
| 2007/0208751 A1 | 9/2007 | Cowan et al. | |
| 2008/0065507 A1* | 3/2008 | Morrison et al. | 705/26 |
| 2008/0229399 A1* | 9/2008 | O'Neil et al. | 726/5 |
| 2009/0288016 A1* | 11/2009 | Bilman et al. | 715/748 |
| 2010/0011315 A1* | 1/2010 | Araki | 715/783 |
| 2010/0180308 A1* | 7/2010 | Howcroft et al. | 725/53 |

* cited by examiner

*Primary Examiner* — Kieu Vu
*Assistant Examiner* — Aaron Lowenberger
(74) *Attorney, Agent, or Firm* — Toler Law Group, PC

(57) ABSTRACT

System and methods to visually present assets and access platforms for the assets are provided. A particular method includes receiving asset data associated with an asset and user data associated with a user. The method includes determining available platforms for the asset from the asset data and the user data. The method includes generating a display including information identifying the asset and an icon corresponding to an access platform in the available platforms. The icon includes a first indicator when the user has an access right to the asset for the access platform. The icon includes a second indicator distinct from the first indicator when the user does not have an access right to the asset for the access platform.

19 Claims, 9 Drawing Sheets

FIG. 6

SYSTEM AND METHOD TO VISUALLY PRESENT ASSETS AND ACCESS PLATFORMS FOR THE ASSETS

FIELD OF THE DISCLOSURE

The present disclosure is generally related to visually presenting assets and platforms for the assets.

BACKGROUND

Products and product offers may be displayed at devices, such as a mobile phone device, a television coupled to a set-top box device, or a computing device, to encourage product purchases by providing information related to goods and services available for purchase. Products for sale or rent may include products usable on different access platforms. Available space for display on such devices may be limited. Because of the limited space available, conveying product information in an easily understandable and concise form is often desirable.

BRIEF DESCRIPTION OF THE DRAWINGS

FIG. 6 depicts a first particular embodiment of a display to visually present assets and access platforms for the assets;

DETAILED DESCRIPTION

Figure 1:
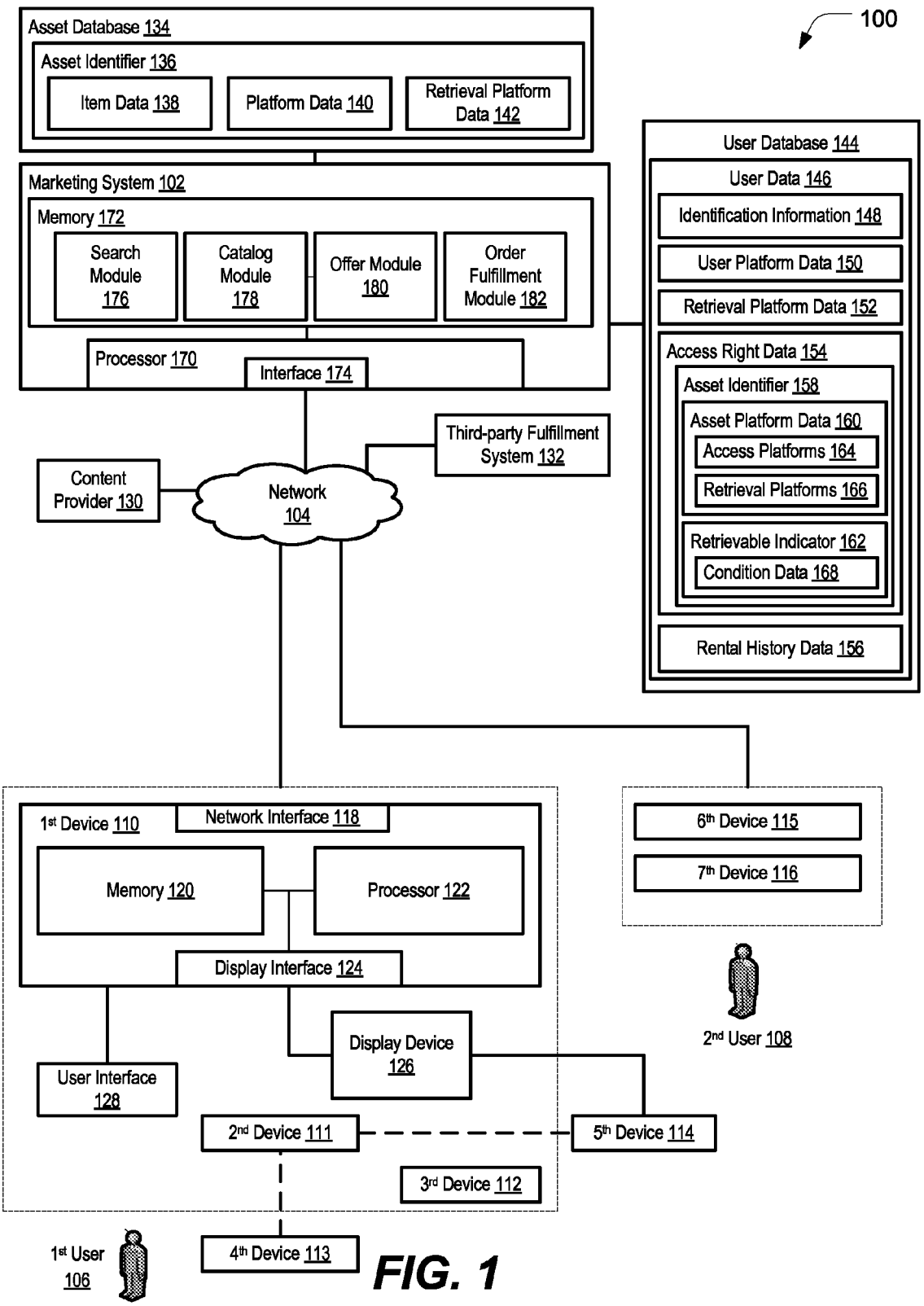
FIG. 1 is a block diagram of a particular embodiment of a system to visually present assets and access platforms for the assets.

Systems and methods to visually present assets and access platforms for the assets are provided. A particular method includes receiving asset data associated with an asset (e.g., a movie). The asset data includes platform data indicating access platforms for the asset (e.g., a computing system with internet access). The method also includes receiving user data associated with a user. The user data includes user platform data indicating access platforms available to the user and access right data for the asset including the access platforms available to the user for the asset when the user has an access right to the asset. The method also includes generating a display. The display includes information identifying the asset and an icon corresponding to an access platform identified in both the platform data and the user platform data. The icon includes a first indicator when the access platform is included in the access right data and a second indicator when the access platform is not included in the access rights data. The second indicator is distinct from the first indicator. The method further includes sending the display to a display device.

Another particular method includes receiving asset data associated with an asset. The asset data includes platform data indicating access platforms for the asset. The method also includes receiving user data associated with a user. The user data includes user platform data indicating access platforms associated with the user. The method also includes determining available platforms. An available platform is an access platform identified in both the platform data and the user platform data. The method also includes generating a display. The display includes information identifying the asset and an icon corresponding to an access platform. The icon includes a first identifier when the access platform is one of the available platforms. The icon includes a second identifier distinct from the first indicator when the access platform is not one of the available platforms. The method further includes sending the display to a display device associated with the user.

In a particular embodiment, a computer-readable storage medium includes operational instructions that, when executed by a processor, cause the processor to determine assets that satisfy a request of a user. The computer-readable storage medium also includes operational instructions that, when executed by the processor, cause the processor to access asset data associated with the assets. The asset data includes platform data that identifies access platforms associated with each of the assets. The computer-readable storage medium also includes operational instructions that, when executed by the processor, cause the processor to access user data. The user data includes user platform data that identifies the access platforms associated with the user. The computer-readable storage medium also includes operational instructions that, when executed by the processor, cause the processor to determine available platforms for each of the assets that satisfy the request. An available platform for an asset is an access platform identified in both the platform data and the user platform data. The computer-readable storage medium further includes operational instructions that, when executed by the processor, cause the processor to send display data to generate a display at a display device. The display includes information identifying each of the assets that satisfy the request along with an icon for each access platform in the platform data. Each icon includes a first indicator when the access platform associated with the icon is one of the available platforms for the asset. Each icon includes a second indicator distinct from the first indicator when the access platform associated with the asset is not one of the available platforms.

A particular system includes a processor and at least one memory accessible to the processor. The least one memory includes an offer module to receive a selection of an asset from a user, platform data indicating access platforms available for the asset, and user platform data indicating access platforms associated with the user. The offer module creates an offer display. The offer display includes information identifying the asset and at least one icon. The at least one icon includes an icon corresponding to each of the access platforms included identified in both the platform data and the user platform data. The icon includes a first indicator that signifies that the user has an access right to the asset. The first indicator is distinct from a second indicator that signifies that the user does not have an access right to the asset. The system further includes an interface to send the offer display to a display device.

Referring to FIG. 1, a block diagram of a particular embodiment of a system to visually present assets and access platforms for the assets is depicted and generally designated 100. The system 100 includes a marketing system 102 coupled to a network 104. The network 104 may be an Internet Protocol Television (IPTV) network, a cable television (CATV) network, a wireless network, a broadband network, or any combination thereof. The marketing system 102 may be used to provide users information about assets, offers to purchase assets, and purchased assets. The assets may be electronic assets, tangible assets or any combination thereof. An asset may be single asset or a bundle that includes two or more assets. Assets may include, but are not limited to, movies, television program episodes, music videos, songs, ring tones, computer programs including games and applications, shirts, caps, cups or combinations thereof.

Users, such as a first user 106 or a second user 108, may access the marketing system 102 via the network 104 using a user device. The first user 106 is able to access the marketing system 102 through the network 104 using a first device 110, a second device 111 or a third device 112. In a particular embodiment, the first device 110 is a set-top box device, the second device 111 is a computing system and the third device 112 is a mobile device. The first device 110, the second device 111 and the third device 112 may be able to use selected assets, retrieve selected assets from the marketing system 102 or both. The first user 106 may have a fourth device 113 and a fifth device 114 that are not able to directly access the marketing system 102 but are able to use assets obtained from the marketing system 102. The fourth device 113 may be a media player, and the fifth device 114 may be a game system. Other users may have the same number of devices, more devices or fewer devices than the first user 106. The other users may have the same types of devices, other types of devices or combinations thereof. For example, the second user 108 may have a sixth device 115 and a seventh device 116. The sixth device 115 may be a set-top box device, and the seventh device 116 may be a mobile device. Only two users are depicted in FIG. 1, but many more users may have access to the marketing system 102.

The first device 110 includes a network interface 118, a memory 120, a processor 122, and a display interface 124. A display device 126 (e.g., a television) and a user interface 128 are coupled to the first device 110. The user interface 128 may be a remote control, a keyboard, or another control device that communicates with the first device 110.

Figure 6:
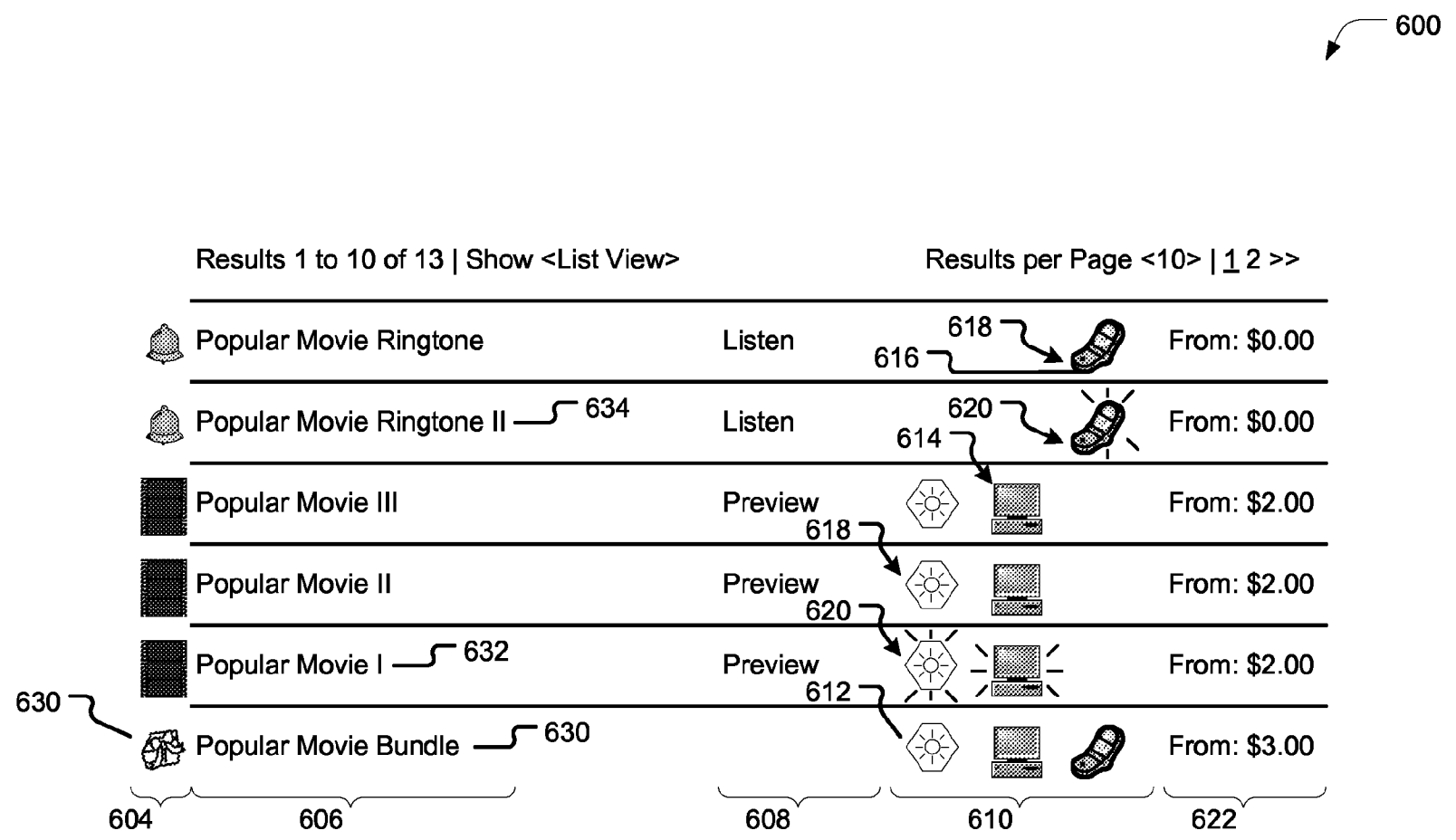

The first device 110 is operable to communicate with the marketing system 102 to request information about particular assets, to request an offer to purchase an asset, and to retrieve certain electronic assets from the marketing system 102. The request for information about particular assets may be initiated from a graphical user interface shown on the display device 126. The first user 106 may select a series of user selectable options using the user interface 128. The user selectable options may initiate a request for information about a specific subset of assets obtainable from the marketing system 102. For example, the first user 106 may select an option to view musical assets, the first user 106 may select another option to view classical music, and the first user 106 may select another option that sends the request to the marketing system 102. Alternately, the first user 106 may enter a query in a search engine interface displayed on the display device 126. The processor 122 may formulate the request and the send the request to the marketing system 102 through the network interface 118. The marketing system 102 may return a display with information for a large number of assets that satisfy the request. The processor 122 may send the display through the display interface 124 to the display device 126. The display may present the information in a form easily viewable and understandable to the first user 106. FIG. 6 depicts a particular embodiment of a portion of a display showing the results of a search for particular assets initiated through a query entered into a search engine interface.

Figure 8:
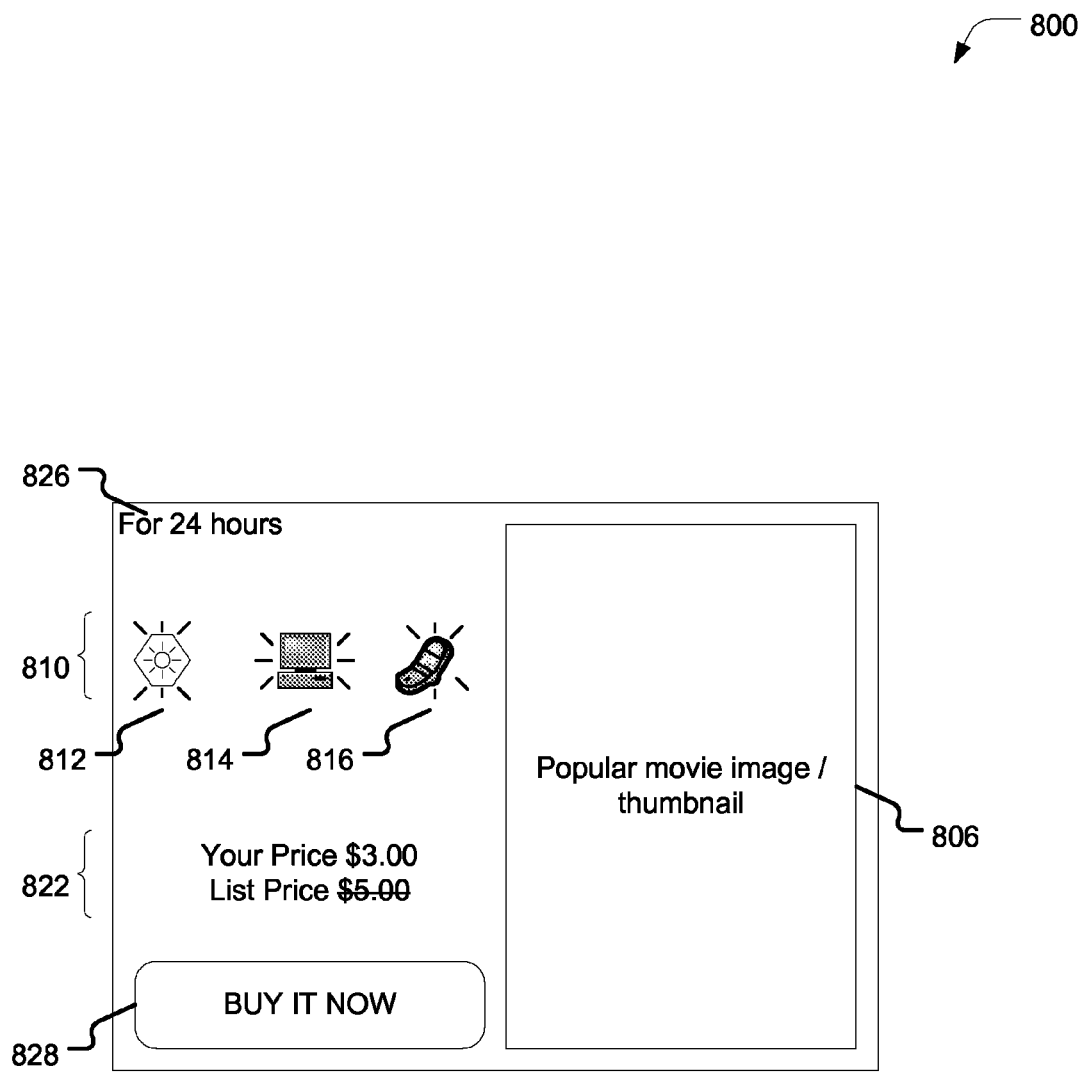
FIG. 8 depicts a third particular embodiment of a display to visually present assets and access platforms for the assets.

The first user 106 may use the user interface 128 to select a user selectable option associated with an asset displayed on the display device 126 as the result of a request. The user selectable option associated with the asset may be a description of the asset, an image representing the asset, or other identifier associated with the asset. When the display returned by the marketing system 102 is an offer, the display may include an identifier of the asset, a price for the asset, access platforms available to the first user 106 to use the asset when the asset is purchased, and an option to purchase the asset. Other information may also be included in the offer. FIG. 8 depicts a particular embodiment of a portion of a display showing an offer.

When a user purchases an electronic asset from the marketing system 102, the user may be presented with one or more options for retrieving the asset from the marketing system 102. The options pertain to retrieval platforms for the asset that the user can use. When the user selects an option for retrieval associated with a particular retrieval platform, the marketing system 102 may communicate with a content provider 130 to obtain the electronic asset and have the electronic asset delivered to a user device associated with the particular retrieval platform.

When a user purchases a tangible asset from the marketing system 102, the marketing system may contact a third party fulfillment system 132. The third party fulfillment system 132 may deliver the tangible asset to the user.

Access platforms may be associated with the assets available from the marketing system 102 and with users of the marketing system 102. Access platforms correspond to devices, services, or devices and services that use the assets or allow the assets to be retrieved. One or more access platforms may be associated with each of the devices 110-116. For example, the first device 110 and the sixth device 115 may be set-top boxes and the associated access platform may be a television access system (e.g., an IPTV system or a cable TV system). The second device 111 may be a computing device associated with two access platforms. The first access platform associated with the second device 111 may be an internet access system. The second access platform associated with the second device 111 may be an operating system used by the computing device. The third device 112 and the seventh device 116 may be mobile devices and the associated access platform may be a wireless access system. The fourth device 113 may be a media player associated with two access platforms. The first access platform associated with the fourth device 113 may be a music player and the second access platform associated with the fourth device 113 may be a video player of certain types of video assets (e.g., musical videos and other video assets with a relatively small file size). The fifth device 114 may be a gaming system and the access platform may be a type of video game playable on the game system. When the fifth device 114 has internet access, another access platform associated with the fifth device 114 may be the internet access system. User devices that have access to the marketing system 102 through the network 104 may be associated with retrieval platforms that can be used to retrieve purchased electronic assets from the marketing system 102. Devices 110-112, 115, 116 may be associated with retrieval platforms. A user device associated with a retrieval platform may include or be coupled to a display device. For example, the display device may be a television when the user device is a set-top box device, the display device may be a computer monitor when the user device is a computing system, and the display device may be the display screen of a mobile device when the user device is the mobile device. When the fifth device 114 has internet access, the fifth device 114 may also be associated with a retrieval platform. When the asset is a tangible asset or includes a tangible asset, the access platform and the retrieval platform for the asset are a delivery option.

Some types of assets may be associated with more than one access platform, retrieval platform or both. For example, a rental video asset may be associated with both an access platform corresponding to television access systems and an access platform corresponding to internet access systems because both access platforms can be used to view the rental video asset. The retrieval platforms for the rental video asset may be the same as the access platforms. A music asset may be associated with multiple access platforms, retrieval platforms or both. The access platforms for musical assets may include an access platform corresponding to television access systems, an access platform corresponding to computing devices, an access platform corresponding to media players, an access platform corresponding to mobile devices or any combination thereof. The retrieval platforms may include a retrieval platform corresponding to television access systems, a retrieval platform corresponding to computing devices having internet access, a retrieval platform corresponding to mobile devices or any combination thereof.

In a particular embodiment, an asset may be associated with a single access platform or retrieval platform even though other access platforms can use the asset. For example, a ring tone asset may be associated only with an access platform for wireless communication even though ring tone assets can be accessed and used by user devices corresponding to other access platforms (e.g., television access systems and internet access systems). In a particular embodiment, the retrieval platforms for an asset may be different than the access platforms for the device. For example, the access platform for ring tone assets may be wireless communication systems. The retrieval platforms for ring tone assets may include wireless communication systems and internet access systems. A purchased ring tone may be sent directly from the marketing system 102 to a mobile device (e.g., third device 112 when purchased by the first user 106 or the seventh device 116 when purchased by the second user 108) or the purchased ring tone may be sent to a computing system with internet access (e.g., the second device 111 when purchased by the first user 106). The ring tone may subsequently be transferred from the computing system (e.g., the second device 111) to the mobile device (e.g., the third device 112).

Some asset types may be associated with only one access platform. For example, when the asset is a game for use on a computing system with a particular type of operating system or a particular type of gaming system, the access platform corresponds to the particular type of computing system or game system that can use the asset.

The marketing system 102 may be coupled to an asset database 134. The asset database 134 may include information regarding all of the assets that a user may obtain through the marketing system 102. The asset database 134 may include an asset identifier 136 associated with each asset. The asset identifier 136 may include a unique identifier (e.g., a unique number) for the asset. The asset identifier 136 may include graphic images of the asset, text descriptions of the asset or combinations thereof. For each asset identifier 136, the asset database 134 may include item data 138, platform data 140, and retrieval platform data 142. The item data 138 may include a name or names of assets that constitute the asset associated with the asset identifier 136. An asset may be a single item or a bundle of items. When the asset is a bundle, the unique identifier for each asset that constitutes the bundle is included in the item data 138 so that access rights can be tracked for the bundle and for the individual assets that constitute the bundle. The platform data 140 may include identifiers of the access platforms that may be usable by a user to access the asset. When the item data 138 may include a tangible item, the platform data 140 includes a delivery option entry as the access platform. The retrieval platform data 142 may include identifiers of the access platforms that the user may use to receive the asset from the marketing system 102. When the item data 138 includes a tangible item, the retrieval platform data 142 includes a delivery option entry as the retrieval platform.

The asset database 134 may also include other information and data. For example, the asset database 134 may include information that can be used to generate icons for each type of asset (e.g., video assets, music assets, game assets, ring tone assets, bundles, tangible items, etc.), indicators signifying characteristics of the access platforms associated with icons, or both.

The marketing system 102 may be coupled to a user database 144 of one or more user databases. The user database 144 may include user data 146 for each user that is able to use the marketing system 102. In some embodiments, access to the marketing system 102 is limited to subscribers of a certain service (e.g., a subscriber of a television access system, such as an IPTV system or a CATV system). In other embodiments, the marketing system 102 is available to anyone who has the capability to access the marketing system 102. The user database 144 may include user data 146 for each user.

The user data 146 may include identification information 148, user platform data 150, retrieval platform data 152, access right data 154, and rental history data 156. The user data 146 may include a unique identifier (e.g., a unique number) for each user. The identification information 148 may include personal information of the user, such as, but not limited to, user name, user address, user phone numbers, user e-mail addresses, Internet Protocol (IP) addresses of user devices, user birthday, etc. The user address provided in the identification information 148 may be a default delivery address for any tangible items that the user purchases through the marketing system 102.

The user platform data 150 may include an identifier for each access platform associated with the user. The retrieval platform data 152 includes an identifier for each access platform associated with the user that can receive an asset from the marketing system 102. When the user is able to receive tangible items purchased from the marketing system, the user platform data 150 and the retrieval platform data 152 include delivery option entries. The delivery option is associated with tangible assets to indicate that such assets will be delivered to the user instead of the assets being retrievable from the marketing system 102. During acquisition of the user data 146 for a particular user or during subsequent editing of the user data 146, the user can select an option to allow acquisition of tangible items from the marketing system 102, or the user can select an option to prohibit the acquisition of tangible items from the marketing system 102. When the user prohibits the acquisition of tangible items from the marketing system 102, the delivery option is not included in either of the user platform data 150 or the retrieval platform data 152.

The access right data 154 may identify each asset that the user has acquired or is currently renting from the marketing system 102. The access right data 154 may include an asset identifier 158, asset platform data 160, and a retrievable indicator 162 for each asset that the user has purchased to own or purchased to rent while the rental term has not expired. The asset identifier 158 corresponds to an asset identifier 136 in the asset database 134. The asset platform data 160 includes an identifier of each access platform 164 that the user has a right to access the asset and an identifier of each retrieval platform 166 that the user may use to receive the asset identified by the marketing system 102.

The retrievable indicator 162 of the access right data 154 may be a flag that indicates whether the user has a pending right to receive the asset identified by the marketing system 102. The retrievable indicator 162 includes condition data 168 that is used by the marketing system 102 to determine when to change the retrievable indicator 162 from a yes condition to a no condition. The condition data 168 may be confirmation of user receipt of the asset, a date or both. For an electronic asset that the user has purchased to own, the retrievable indicator 162 may be in the yes condition until the user has retrieved the asset from the marketing system 102. For a tangible asset that the user has purchased, the retrievable indicator 162 may remain in the yes condition until the marketing system 102 initiates delivery of the tangible asset. For a rented asset, the retrievable indicator 162 remains in the yes condition until a rental term for the asset expires. The rental term may expire upon receipt of the asset by the user, upon a particular date or a combination thereof. After the rental term expires, the particular access right data for the rental asset is removed from the access right data 154 and placed in the rental history data 156. The rental history data 156 and the access right data 154 may be used by the marketing system 102 as input data for generating recommendations of assets for the user.

The user database 144 may include additional information. For example, the user database 144 may include information that may be used to generate icons for display. The icons may be representations of various access platforms. For example, the information may be used to generate icons that are graphical representations of objects associated with the access platforms (e.g., a truck for the delivery option, a remote control for a television access system, etc.) for displays at certain display devices, such as televisions or computer monitors. The information may be used to generate icons that are letters associated with the access platforms. For example, letters may be used to represent access platforms rather than graphical representations. Letters may be used when the display device is a screen for a mobile device or other display device with limited graphical capabilities.

The marketing system 102 may be coupled to the content provider 130 and to the third-party fulfillment system 132 through the network 104. The marketing system 102 may use the content provider 130 to send purchased electronic assets to users who have purchased the electronic assets. The marketing system 102 may use the third-party fulfillment system 132 to have purchased tangible assets delivered to users who have purchased tangible assets.

The marketing system 102 includes a processor 170 and a memory 172 accessible to the processor 170. The processor 170 may include an interface 174 that allows the processor 170 to communicate with the devices 110-112, 115, 116 that are able to directly access the marketing system 102. The memory 172 may include a search module 176, a catalog module 178, an offer module 180, and an order fulfillment module 182. The marketing system 102 may also include other modules for additional tasks. The search module 176 may receive a request from a user for information regarding assets that the user is interested in purchasing, where the request is from a user device coupled to the marketing system 102 through the network 104. The search module 176 may include a search engine that interacts with the asset database 134 to find assets that satisfy the user request. The results of the search may be provided to the catalog module 178. The catalog module 178 may create a display for a display device associated with the user device. The display may present the search results in a form that is simple, easy to understand, and contains information useful to the user. For example, the display may include a visual representation of an asset and icons representing each access platform available to use the asset. The icons may include indicators that provide information about the characteristics of the platform, the asset or both (e.g., an icon may include a first indicator that shows that the access platform associated with the icon is available to the user for the asset and the user has an access right to the asset for the access platform, a second indicator that the access platform associated with the icon is available to the user for the asset and the user does not have an access right to the asset for the platform, and a third indicator that the asset may be used on the access platform associated with the icon but that the user does not have access to the access platform).

When the marketing system 102 receives a selection of a visual representation of an asset that the user can purchase, the offer module 180 may create an offer display that includes an offer to the user to purchase the asset. The offer display may present a representation of the asset, the access platform or access platforms that will be usable to access the asset upon acceptance of the offer, a price for the asset, and a user selectable acceptance option. The offer display may also include other information, including but not limited to, a time limit during which the price will not change, a time limit for a rental asset, a list price for the asset, an indication that the user has an existing right to the asset, other information associated with the user or asset, or combinations thereof. For example, the offer display may include an indicator that the user has an existing right to the asset when the user has previously purchased to own the asset, received the asset, deleted or otherwise lost the ability to use the asset, and decided to repurchase the asset. The indicator may inhibit accidental repurchase of an asset.

The order fulfillment module 182 may be operable to receive a purchase confirmation when a user accepts an offer provided by the offer module 180. After receipt of a purchase confirmation, the order fulfillment module 182 accesses the user database 144 and the asset database 134. The order fulfillment module 182 adds the asset identifier 136 of the purchased asset and corresponding information to the access right data 154. The access platforms 164 are updated to include the access platforms that are included in both the platform data 140 for the asset and the user platform data 150 for the user. The retrieval platforms 166 are updated to include the retrieval platforms that are included in both the retrieval platform data 142 for the asset and the retrieval platform data 152 for the user. The retrievable indicator 162 is set to a yes condition, and the condition data 168 for changing the retrievable indicator 162 is entered. When the asset is a bundle, an entry for the bundle and an entry for each of the assets that constitute the bundle are made in the access right data 154.

When the purchased asset is or includes a tangible asset, the order fulfillment module 182 may inform the user that the tangible asset will be sent to the address listed in the identification information 148 associated with the user and may provide the user with the option to have the tangible item sent to a different address. After a destination address is established, the order fulfillment system 182 contacts the third-party fulfillment system 132 to have the tangible item delivered to the destination address. When the third-party fulfillment system 132 confirms receipt of the order for delivery of the tangible asset, the retrievable indicator 162 in the access right data 154 of the user data 146 for the user is changed to a no condition. The marketing system 102 may receive a tracking number for the asset from the third party fulfillment system 132. The marketing system 102 may provide the tracking number to the user.

When the purchased asset is or includes an electronic asset, the order fulfillment module 182 provides information to the user including instructions regarding retrieving the asset using the retrieval platforms listed in the retrieval platforms 166 of the access right data 154. When the user accesses the marketing system 102 using a user device associated with a retrieval platform in the retrieval platforms 166 of the access right data 154 and when the user requests that the purchased asset be sent to the user device, the order fulfillment module 182 contacts the content provider 130 and the asset is sent to the user device using the network 104. For example, the first user 106 purchases a rental video asset having retrieval platforms corresponding to the first device 110 and the second device 111 while accessing the marketing system 102 from the first device 110. The user decides to watch the purchased asset immediately. Since the first device 110 corresponds to a retrieval platform in the retrieval platforms 166 of the access right data 154, the first user 106 selects the appropriate options from a graphical user interface to have the marketing system 102 send the purchased asset to the first device 110 so that the user can view the rental video asset on the display device 126 coupled to the first device 110.

A user may have a purchased asset sent to a device that is not the same as the device used to access the marketing system 102. For example, the second user 108 may purchase a video asset using the seventh device 116. While using the seventh device 116, the second user 108 may instruct the marketing system 102 to deliver the purchased video asset to the sixth device 115, which is active and can be accessed by the marketing system 102. When the sixth device 115 is not active and accessible by the marketing system 102, the marketing system 102 may inform the second user 108 via the seventh device 116 of a delivery failure of the purchased video asset. The second user 108 may retry the delivery or try to have the purchased asset delivered when the second user 108 is accessing the marketing system 102 using the sixth device 115.

After delivery of a purchased electronic asset, the order fulfillment module 182 changes the status of the retrievable indicator 162 when the delivery satisfies a condition in the condition data 168. When a user has purchased rental assets, the order fulfillment module 182 may periodically check the condition data 168 to verify that a rental term is not expired. After the rental term of an asset has expired, the access right data 154 for the asset may be moved to the rental history data 156.

Figure 2:
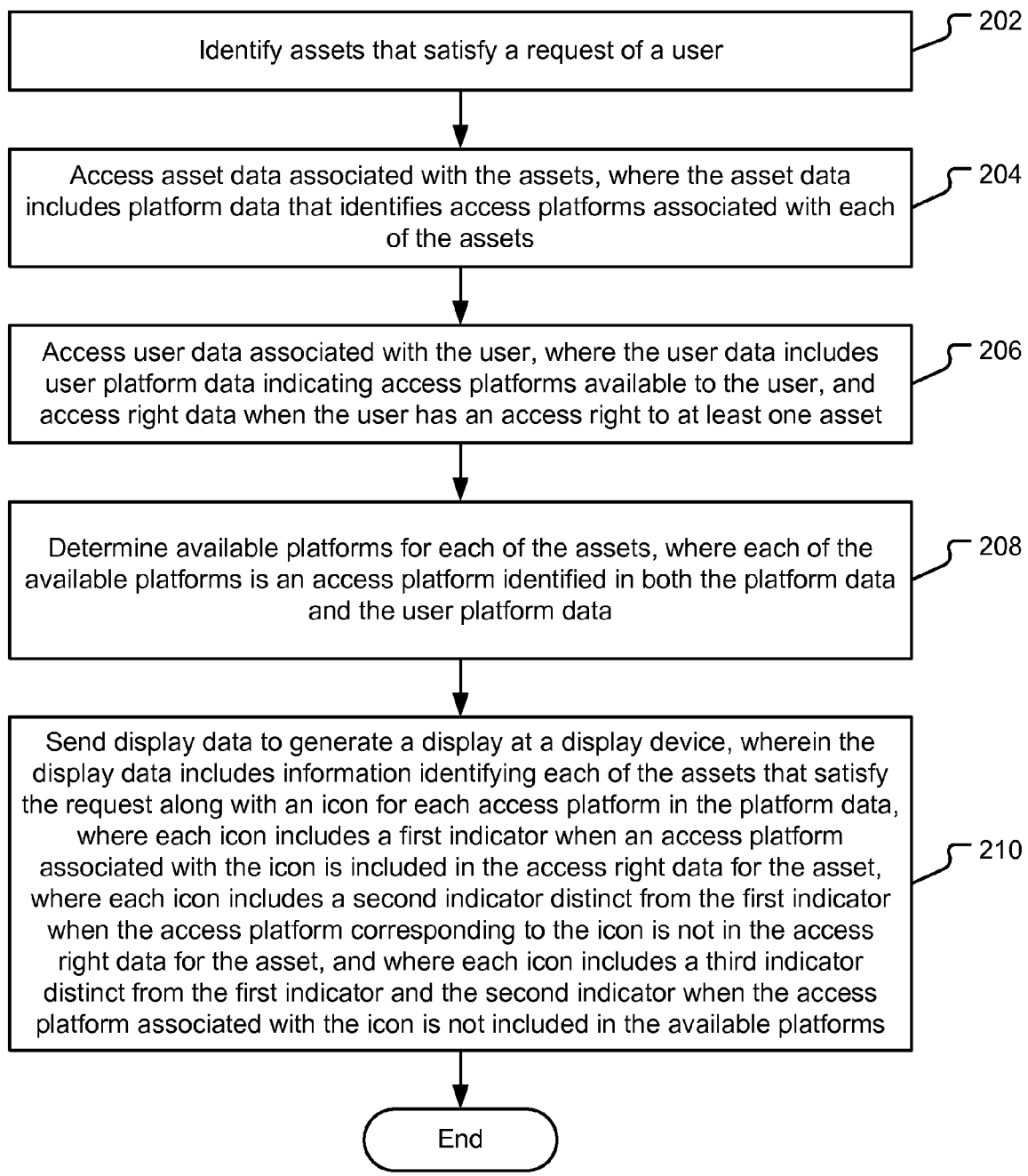
FIG. 2 is a flow diagram of a first particular embodiment of a method to visually present assets and access platforms for the assets.

Referring to FIG. 2, a first particular embodiment of a method to visually present assets and access platforms for the assets is illustrated. In a particular embodiment, the method illustrated in FIG. 2 may be performed by a marketing system 102 as disclosed with reference to FIG. 1. The method may include, at 202, determining assets that satisfy a request of a user. At 204, asset data associated with assets may be accessed. The asset data may include platform data that identifies access platforms associated with each of the assets that satisfy the request. For example and with reference to FIG. 1, the asset data may include the platform data 140. At 206 of FIG. 2, user data associated with the user may be accessed. The user data may include user platform data indicating access platforms available to the user, and access right data when the user has an access right to at least one asset. For example and with reference to FIG. 1, the user data may include the user platform data 150 and the access right data 154. At 208 of FIG. 2, available platforms may be determined. For example and with reference to FIG. 1, an available platform may be an access platform that is included in both the platform data 140 and the user platform data 150 as disclosed with reference to FIG. 1.

At 210 of FIG. 2, display data may be sent to generate a display at a display device. The display may include information identifying each of the assets that satisfy the request along with an icon for each access platform in the platform data. Each icon may include a first indicator when an access platform associated with the icon is included in the access right data for the asset. An icon with a first indicator may indicate to the user that the user has an access right to the asset for the access platform associated with the icon. Each icon may include a second indicator that is distinct from the first indicator when the access platform corresponding to the icon is not in the access right data for the asset. An icon with a second indicator may indicate to the user that the asset is available for purchase. Each icon may include a third indicator distinct from the first indicator and the second indicator when the access platform associated with the icon is not included in the available platforms. An icon with a third indicator may also indicate to the user that the asset is available for the access platform corresponding to the icon, but that the user is not able to use the access platform.

Figure 3:
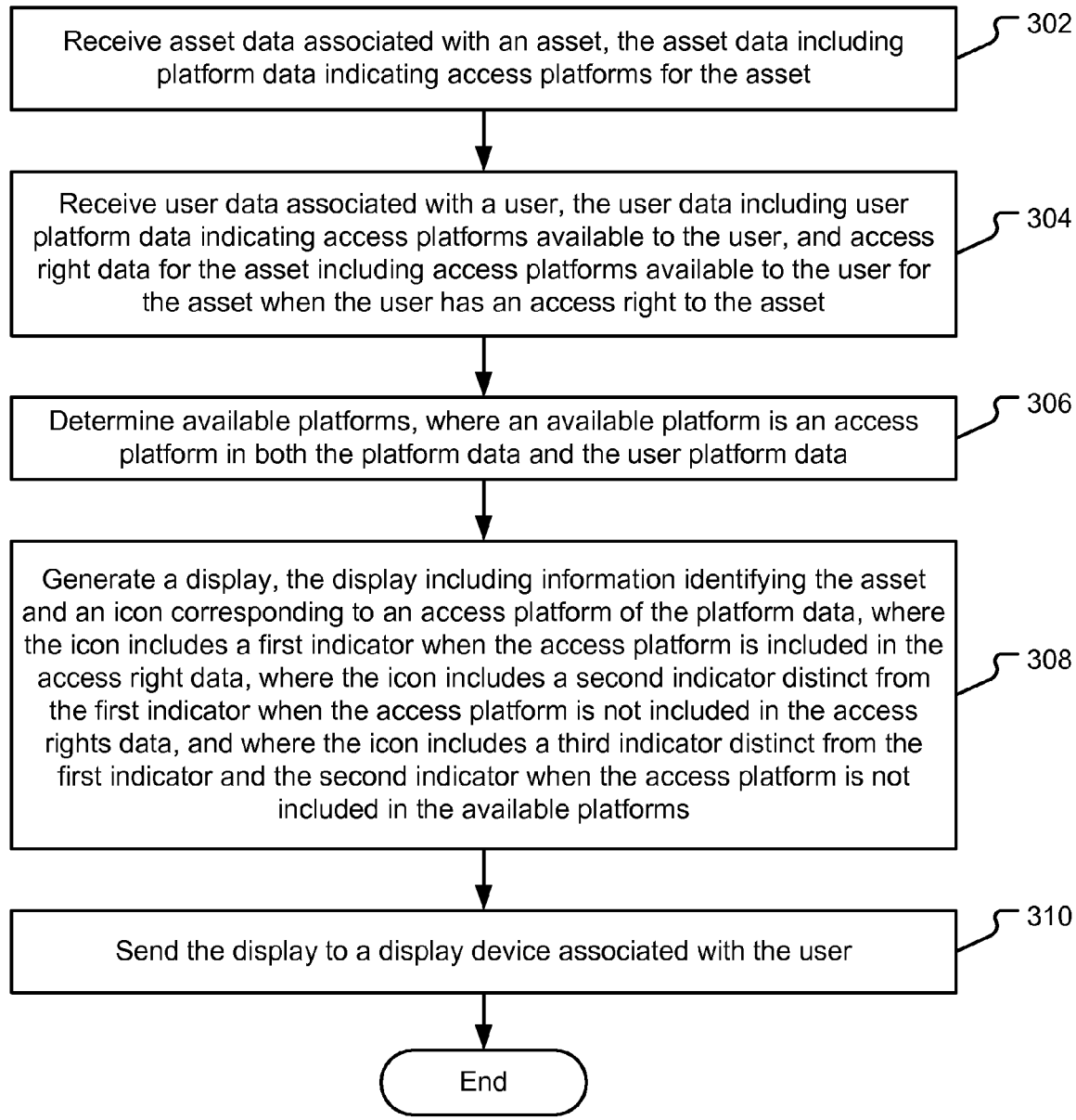
FIG. 3 is a flow diagram of a second particular embodiment of a method to visually present assets and access platforms for the assets.

Referring to FIG. 3, a second particular embodiment of a method to visually present assets and access platforms for the assets is illustrated. In a particular embodiment, the method illustrated in FIG. 3 may be performed by a marketing system 102 as disclosed with reference to FIG. 1. The method may include, at 302, receiving asset data associated with an asset. The asset data may include platform data indicating access platforms for the asset. For example and with reference to FIG. 1, the asset data may include the platform data 140. User data associated with a user may be received at 304 of FIG. 3. The user data may include user platform data indicating access platforms available to the user. The user data also may include access right data for the asset including access platforms available to the user for the asset when the user has a pending access right to the asset. For example and with reference to FIG. 1, the user data may include the user platform data 150 and the access right data 154. At 306 of FIG. 3, available platforms may be determined. For example and with reference to FIG. 1, an available platform may be an access platform that is included in both the platform data 140 and the user platform data 150.

A display may be generated at 308 of FIG. 3. The display may include information identifying the asset and an icon corresponding to an access platform of the platform data. The icon may include a first indicator when the access platform is included in the access right data. When the icon has the first indicator, the user may be informed of an existing right to the asset for the access platform associated with the icon. The icon may include a second indicator distinct from the first indicator when the access platform is not included in the access rights data. When the icon has the second indicator, the user may be informed that the asset is available for purchase. The icon may include a third indicator distinct from the first indicator and the second indicator when the access platform is not included in the available platforms. When the icon has the third indicator, the user may be informed that the asset is available for the access platform corresponding to the icon, but that the user is not able to use the access platform. The method may include, at 310, sending the display to a display device associated with the user.

Figure 4:
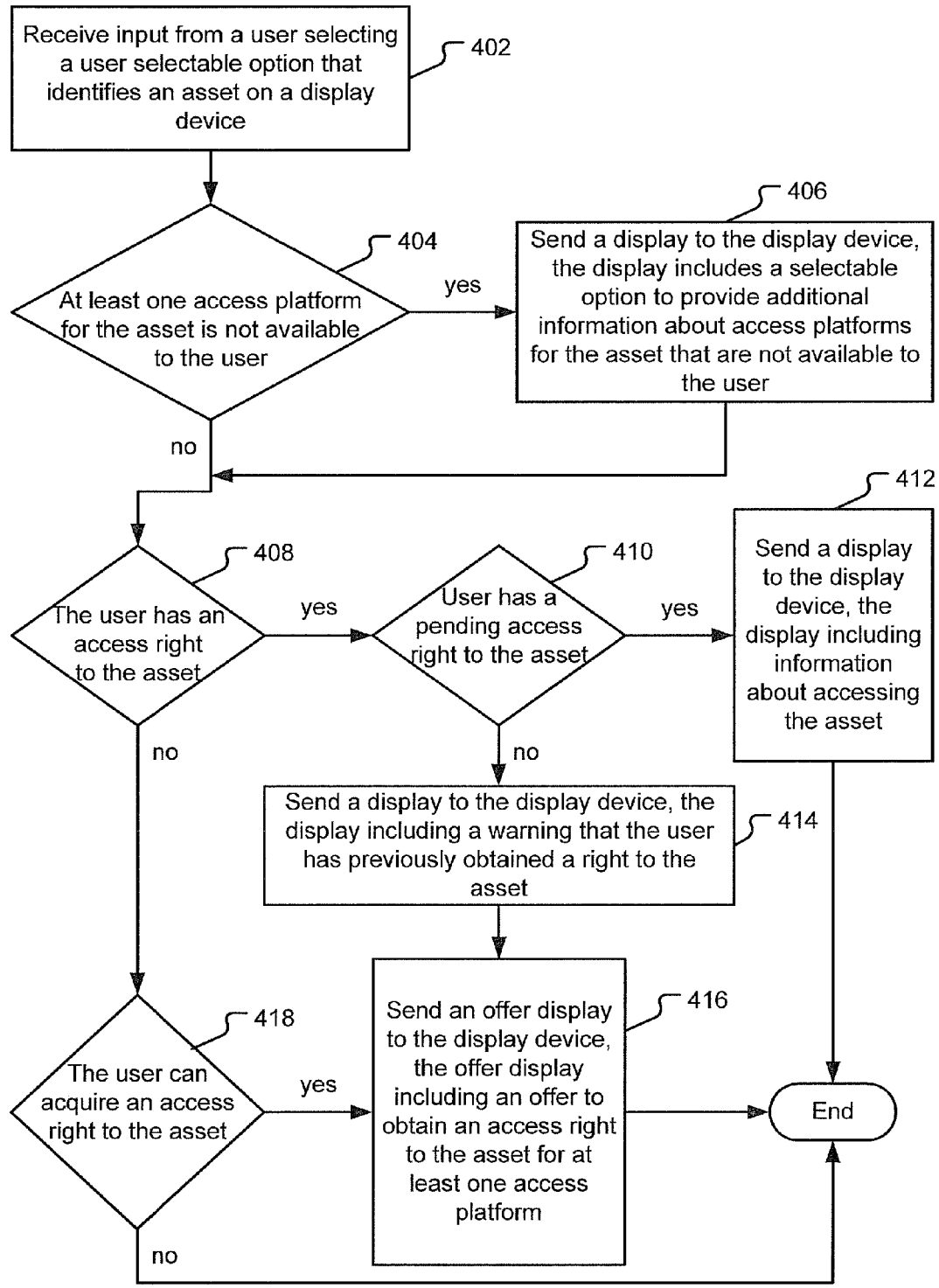
FIG. 4 is a flow diagram of a third particular embodiment of a method to visually present assets and access platforms for the assets.

Referring to FIG. 4, a third particular embodiment of a method to visually present assets and access platforms for the assets is illustrated. In a particular embodiment, the method illustrated in FIG. 4 may be performed by a marketing system 102 as disclosed with reference to FIG. 1. The method may include, at 402, receiving input from a user selecting a user selectable option that identifies an asset on a display device. At 404, a determination may be made whether at least one access platform for the asset is not available to the user. For example and with reference to FIG. 1, an access platform may not be available to a user when the access platform is in the platform data 140 for the asset in asset database 134, but is not in the user platform data 150 for the user in the user database 144. When at least one access platform for the asset is not available to the user, the method may continue at 406 of FIG. 4. When all of the access platforms are available to the user, the method may continue at 408.

At 406, a display may be sent to the display device. After the display is sent, the method may continue at 408. The display may include a selectable option to provide additional information about access platforms that are not available to the user. The additional information provided may depend on the nature of the access platform. When an unavailable access platform corresponds to a service (e.g., a service that provides access to a television access system, an internet access system, or a wireless access system), the additional information may include information indicating how the user may acquire the service. For example, the user may be directed to a web site of a service provider. The web site may provide a telephone number for the user to call to initiate obtaining the service, or a form that the user fills with information so that an agent of the service provider may contact the user about acquiring the service. When the user has already acquired the service or the unavailable access platform corresponds to a user device (e.g., a game system or a media player), the additional information may include a graphical user interface that allows the user to inform the marketing system of a new access platform to be associated with the user. For example and with reference to FIG. 1, the graphical user interface may be used to inform the marketing system 102 that the user has added the new access platform corresponding to a service or device so that the marketing system 102 may update user platform data 150 and access right data 154 for the user to reflect the new access platform. When the new access platform corresponds to a service that is a retrieval platform, the marketing system 102 may update with the new retrieval platform the user retrieval platform data 152 and the retrieval platforms 166 in the access right data 154 for assets that can use the new access platform as a retrieval platform.

As shown in FIG. 4 at 408, a determination may be made whether the user has an access right to the asset. The user has an access right for the asset when data associated with the asset is present in access right data associated with the user. For example and with reference to FIG. 1, the presence of the access right for the asset is indicated by the presence of a unique identifier of the asset identifier 136 from the asset database 134 in the asset identifier 158 of the access right data 154 for the user. When the user has an access right to the asset, the method may continue at 410 of FIG. 4. When the user does not have an access right to the asset, the method may continue at 418.

A determination may be made whether the user has a pending right to the asset at 410. The presence of a pending right to the asset may be indicated in data associated with the user. For example and with reference to FIG. 1, the presence of a pending right is indicated when the retrievable indicator 162 in the access right data 154 is in a yes condition. When the user has a pending right to the asset, the method may continue at 412 of FIG. 4, where a display is sent to the display device. The display may include information about accessing the asset. For example, when the user is accessing the marketing system from an access platform that is also a retrieval platform for the asset, the display may display a representation of the asset and a user selectable retrieve option. When the user selects the retrieve option, the asset may be sent to the user. After the display is sent at 412, the method may end.

When the user does not have a pending right to the asset at 410, the method may continue at 414, where a display is sent to the display device. The display may include an indicator (e.g., a warning) that the user has previously obtained a right to the asset from a marketing system. For example, the indicator may include text that states "You have previously purchased this item before." The indicator may be in a color or style that draws the attention of the user to the indicator. The display of the indicator may occur when the user had previously purchased to own an asset from the marketing system, received the asset, subsequently lost the ability to use the asset (e.g., deleted the asset from the computer-readable storage medium where the asset resided when the asset is an electronic asset), and decided to repurchase the asset. The user may rent an asset the user previously rented without receiving an indicator that the user has previously obtained a right to the asset due to the way the marketing system handles data corresponding to the asset when the rental term for the asset ends. The method may continue at 416.

An offer display may be sent to the display device at 416. The offer display may include an offer to obtain an access right to the asset for at least one access platform. After the offer display is sent, the method may end.

At 418, a determination may be made whether the user can acquire an access right to the asset. For example and with reference to FIG. 1, the user may obtain a right for the asset when at least one access platform for the asset is in both the platform data 140 for the asset and in the user platform data 150 for the user. When the user may obtain a right for the asset, the method may continue at 416 of FIG. 4, where an offer display is sent to the display device. The offer display may include an offer to obtain an access right to the asset for at least one access platform. After the offer display is sent, the method may end. When the user cannot obtain a right for the asset, the method may end.

Figure 5:
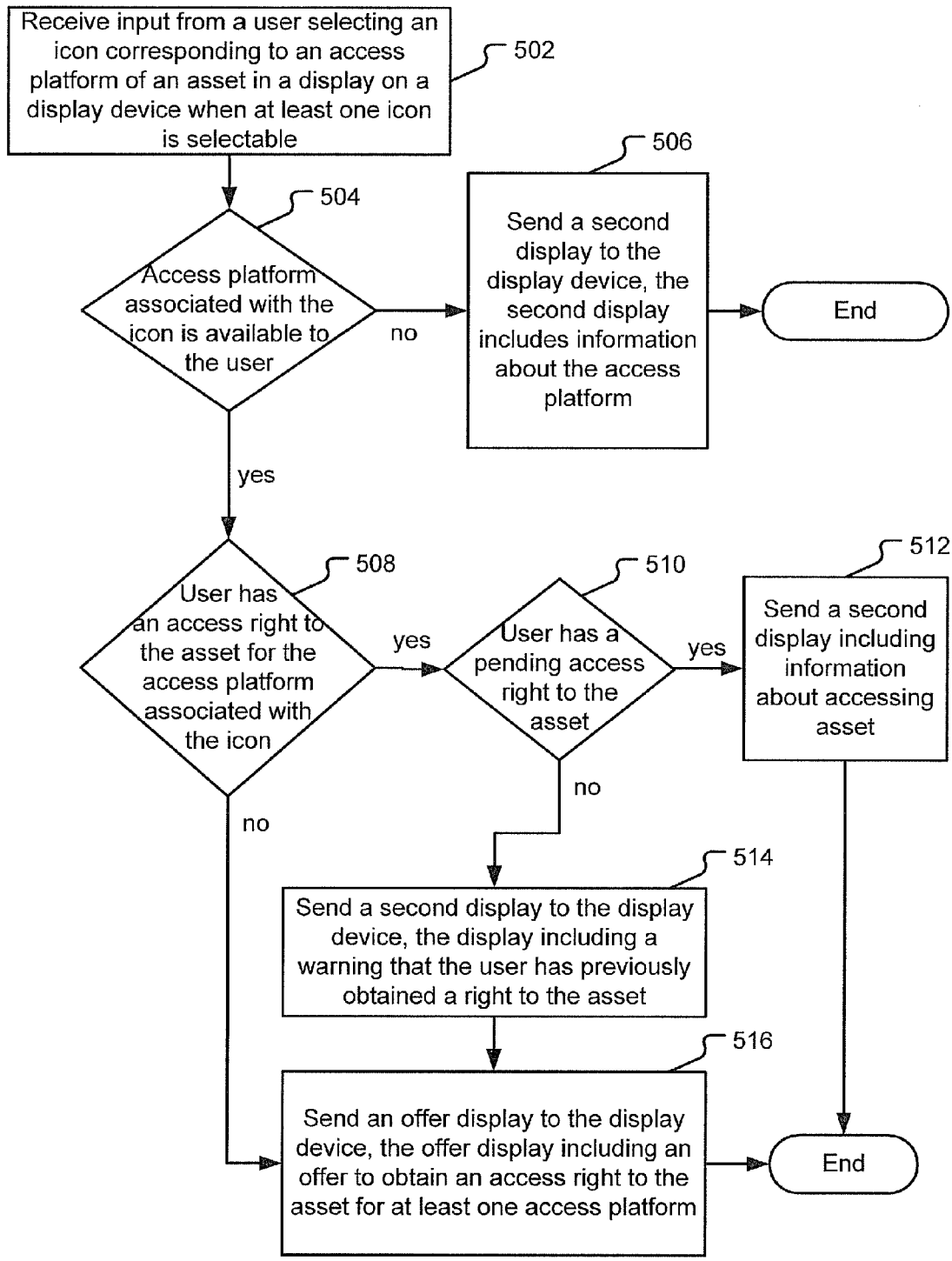
FIG. 5 is a flow diagram of a fourth particular embodiment of a method to visually present assets and access platforms for the assets.

Referring to FIG. 5, a fourth particular embodiment of a method to visually present assets and access platforms for the assets is illustrated. In a particular embodiment, the method illustrated in FIG. 5 may be performed by a marketing system 102 as described with reference to FIG. 1. The method may include, at 502, receiving input from a user selecting an icon corresponding to an access platform of an asset in a display on a display device when at least one icon is selectable. At 504, a determination may be made whether the access platform associated with the icon is available to the user. For example and with reference to FIG. 1, access platforms that are not available to the user may include access platforms that are included in the platform data 140, but not in the user platform data 150. When the access platform associated with the icon is not available to the user, the method may continue at 506 of FIG. 5. When the access platform is available to the user, the method may continue at 508.

At 506, a second display may be sent to the display device. The second display may include information about the access platform that is not available to the user. When the access platform corresponds to a service (e.g., a service that provides access to a television access system, an internet access system, or a wireless access system), the information may include information about how to acquire the service. When the access platform that is not available to the user is a service that the user has already acquired or when the access platform corresponds to assets that the user wishes to purchase, the information may include a graphical user interface that enables the user to update access platforms associated with the user. For example and with reference to FIG. 1, the graphical user interface is used to inform the marketing system 102 that the user has added the new access platform so that the marketing system 102 may update user platform data 150 and access right data 154 for the user to reflect the new access platform. When the new access platform corresponds to a service that is a retrieval platform, the marketing system 102 may update the retrieval platforms 166 in the access right data 154 for assets that can use the new access platform as a retrieval platform and the user retrieval platform data 152 with the new retrieval platform. After the second display is sent at 506 of FIG. 5, the method may end. In some embodiments, only the icons associated with access platforms that are not available to the user are selectable. When only the icons associated with the access platforms that are not available to the user are selectable, the method may end when the selected icon is an access platform available to the user.

At 508, a determination may be made whether the user has an access right to the asset for the access platform associated with the icon. The user has an access right to the asset for the access platform associated with the icon when data associated with the asset and the access platform is present in access right data associated with the user. For example and with reference to FIG. 1, the presence of the access right for the asset for the asset platform associated with the icon is indicated by the presence of a unique identifier of the asset identifier 136 from the asset database 134 in the asset identifier 158 of the access right data 154 for the user and the presence of the access platform in the access platforms 164. When the user has an access right to the asset for the access platform associated with the icon, the method may continue at 510 of FIG. 5. When the user does not have an access right to the asset for the access platform associated with the icon the user can acquire an access right to the asset and the method may continue at 516.

At 510, a determination may be made whether the user has a pending right to the asset. The presence of a pending right to the asset may be indicated in data associated with the user. For example and with reference to FIG. 1, the presence of a pending right is indicated when the retrievable indicator 162 in the access right data 154 is in a yes condition. When the user has a pending right to the asset, the method may continue at 512 of FIG. 5, where a second display is sent to the display device. The second display may include information about accessing the asset. After the second display is sent, the method may end.

When the user does not have a pending right to the asset, at 510, the method may continue at 514, where a second display is sent to the display device. The second display may include a warning that the user has previously obtained a right to the asset. The warning may prevent unintentional repurchase of an asset that was previously purchased. The method may continue at 516.

At 516, an offer display may be sent to the display device. The offer display may include an offer to obtain an access right to the asset for at least one access platform. After the offer display is sent, the method may end.

FIG. 6 depicts a first particular embodiment of a display 600 to visually present assets and access platforms for the assets. The display 600 may be for a display device capable of displaying graphics. The display 600 may include a header 602 that displays information about the search result and controls for viewing the result. The display 600 may include asset type icons 604 corresponding to each type of asset. The asset type icons 604 may include a representation of a bell for ring tones, a representation of a piece of film for a video asset and a representation of a wrapped gift for a bundle. Other types of assets may also have associated asset icons. In a particular embodiment and with reference to FIG. 1, the information needed to generate the asset type icons asset type icons 604 may be included in an asset database 134.

The display may include asset identifiers 606 as depicted in FIG. 6. The asset identifiers 606 may be words that describe the asset. In other displays, the asset identifiers may be graphic images associated with the asset. The asset identifiers 606 may be selectable by the user. In a particular embodiment and with reference to FIG. 1, the asset identifiers 606 may correspond to information in the asset identifier 136 of the asset database 134 for each asset in the search result.

The display 600 may include preview options 608 as depicted in FIG. 6. The preview options 608 may be selectable by the user to sample at least a portion of the asset before purchasing the asset.

The display 600 may include access platform icons 610. The access platform icons 610 may include an icon for each access platform available to the user. A first icon type 612 may resemble a remote control. The first icon type 612 may be associated with an access platform corresponding to a television access system. A second icon type 614 may resemble a computer. The second icon type 614 may be associated with an access platform corresponding to an internet access system. A third icon type 616 may resemble a cellular phone. The third icon type 616 may be associated with an access platform for a wireless communication system. Other icon types may also be used. For example, an icon type resembling a truck may represent an access platform associated with physical delivery of a tangible asset. In a particular embodiment and with reference to FIG. 1, the information for generation of the access platform icons 610 may be in the user database 144.

Some of the access platform icons 610 may include a first indicator 618 as depicted in FIG. 6. The first indicator 618 may be a color code, other visual indicator, or both. The color code may be the same for each icon 610 that has the first indicator 618, regardless of the access platform associated with the icon 610. In FIG. 6, the color code for the first indicator 618 is a shade of gray. For example, each icon type 612, 614, 616 associated with a "Mission Impossible Bundle" identifier 630 has the first indicator 618.

An icon type 612, 614, 616 having the first indicator 618 may inform the user that an asset associated with the icon type 612, 614, 616 is available for purchase. The access platform associated with the icon type 612, 614, 616 having the first indicator 618 may be used to retrieve the asset, use the asset, or both.

Some of the access platform icons 610 may include a second indicator 620. As depicted in FIG. 6, the icon types 612, 614 associated with a "Mission: Impossible I" identifier 632 have the second indicator 620, and the icon type 616 associated with a "Mission Impossible Ringtone II" identifier 634 has the second indicator 620. The second indicator 620 is depicted in FIG. 6 by rays extending from the icons 610 that include the second indicator 620. The second indicator 620 may be a color code, other visual indicator, or both. The second indicator 620 may be different for each type of access platform. Therefore, each icon type 612, 614, 616 may have a distinct second indicator 620. For example, the second indicator 620 associated with the icon type 612 may be a purple color, the second indicator 620 associated with the icon type 614 may be a blue color, and the second indicator 620 associated with the icon type 616 may be an orange color. The second indicator for other icons associated with other access platforms may be other types of distinct identifiers. For example, the second indicator associated with an icon for the access platform for delivery (e.g., a truck) may be the color black (e.g., for the tires), the color brown (e.g., for the body of the truck), and an underscore to represent a road and indicate that the asset is on the way to the user.

The second indicator 620 may be a visual indication that the user has an access right to the asset for the access platform associated with the icon having the second indicator 620. In some embodiments, the type of access right (e.g., ownership or rental) may be indicated in the space between the asset identifiers 606 and the preview options 608.

The display 600 may include price indicators 622. The price indicators 622 may include the lowest available price for the asset.

Figure 7:
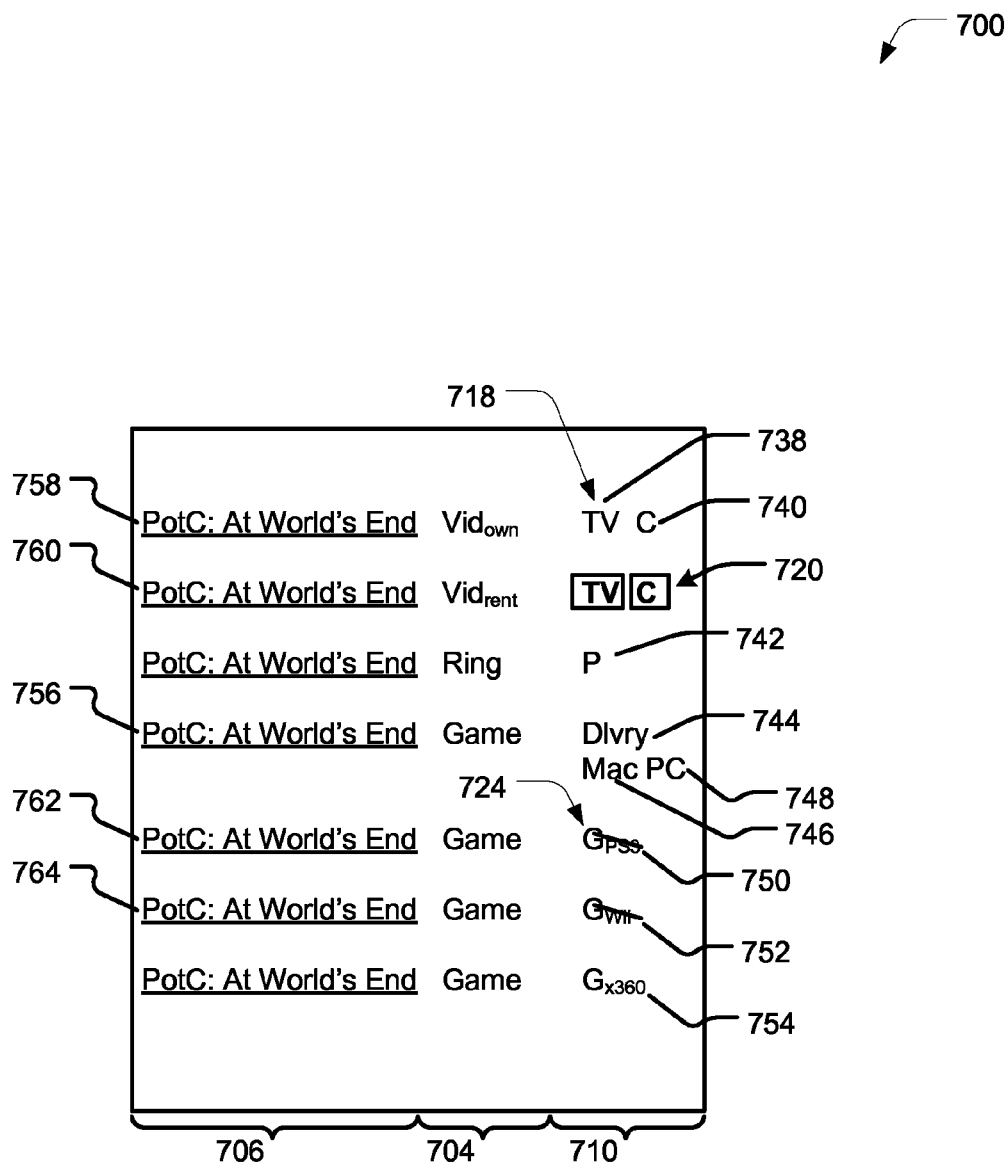
FIG. 7 depicts a second particular embodiment of a display to visually present assets and access platforms for the assets.

FIG. 7 depicts a second particular embodiment of a display to visually present assets and access platforms for the assets. In a particular embodiment, the display illustrated in FIG. 7 may be provided by a marketing system 102 as disclosed with reference to FIG. 1. The display 700 may be for a display device that has limited graphics capabilities. For example, the display 700 may be shown on a display device of a mobile device. The display 700 may include asset type identifiers 704. The displayed asset types may be a video with an ownership right, a rental video, a ring tone, and games. The display 700 may include asset identifiers 706. In a particular embodiment and with reference to FIG. 1, the asset identifiers 706 may correspond to information in the asset identifier 136 of the asset database 134 for each asset in the search result.

The display 700 may include access platform icons 710. The access platform icons 710 may include an icon type for each access platform. For example, a "TV" icon type 738 may be associated with the access platform for a television access system, a "C" icon type 740 may be associated with the access platform for an internet access system, a "P" icon type 742 may be associated with the access platform for a wireless access system, a "Dlvry" icon type 744 may be associated with the access platform for a delivery option, a "Mac" icon type 746 may be associated with the access platform for a first type of computer, a "PC" icon type 748 may be associated with the access platform for a second type of computer, a "$G_{ps3}$" icon type 750 may be associated with the access platform for a first type of gaming system, a "$G_{Wii}$" icon type 752 may be associated with the access platform for a second type of gaming system, and a "$G_{x360}$" icon type 754 may be associated with the access platform for a third type of gaming system. The icon types 738-754 are representative icon types. Other icons could be used for icon types 738-754, additional icons could be used to represent additional access platforms, or both.

In FIG. 7, a first identifier 756 is associated with access platform icons including the "Dlvry" icon type 744. The "Dlvry" icon type 744 indicates that the asset associated with the first identifier 756 is a tangible asset that will be delivered to the user. Further, the first identifier 756 includes the "Mac" icon type 746 and the "PC" icon type 748 indicating that the user will obtain rights to the asset associated with the first asset identifier 756 for the access platforms corresponding to the "Mac" icon type 746 and the "PC" icon type 748 should the user purchase the asset.

Some of the access platform icons 710 may include a first indicator 718. The first indicator 718 may be a color code, other visual indicator, or both. For example, the first indicator 718 may be text shown in a particular font, font size, font style or combination thereof. The first indicator 718 may be the same for each icon that has the first indicator 718, regardless of the access platform associated with the icon. In the embodiment depicted in FIG. 7, the first indicator 718 is illustrated when the associated icon type is shown in a regular font. For example, the icon types 744-748 associated with first asset identifier 756 and icon types 738, 740 associated with a second asset identifier 758 each have the first indicator 718.

An icon having the first indicator 718 may inform the user that an asset associated with the icon is available for purchase. The access platform associated with the icon having the first indicator 718 may be used to retrieve the asset, use the asset, or both.

Some of the access platform icons 710 may include a second indicator 720. The second indicator 720 may be a color code, other visual indicator, or both. The second indicator 720 may be different for each type of access platform. Therefore, each icon may have a distinct second indicator. In other embodiments, the second indicator may be the same for each type of access platform. In the embodiment depicted in FIG. 7, the second indicator 720 is illustrated when the associated icon type is shown in a bold format with a box around the icon. For example, the icons 738, 740 associated with third asset identifier 760 each include the second indicator 720.

An icon having the second indicator 720 may inform the user that the user has previously purchased a right to an asset associated with the icon. The user has a right to the asset for the access platform associated with the icon. In the embodiment depicted in FIG. 7, the user has a rental right to the asset corresponding to a third asset identifier on both the access platform associated with the "TV" icon 738 and the access platform associated with the "C" icon 740.

Some of the access platform icons 710 may include a third indicator 724. The third indicator 724 may be a color indicator, other indicator, or both. The third indicator 724 may be a visual indicator that the asset is available for the access platform associated with the icon, but the user is not able to use the access platform. In the embodiment depicted in FIG. 7, the third indicator 724 is illustrated when the associated icon type is shown with a strikethrough. For example, the icon types 750, 752 associated with a fourth asset identifier 762 and a fifth asset identifier 764 each have the third indicator 724.

FIG. 8 depicts a third particular embodiment of a display to visually present assets and access platforms for the assets. In a particular embodiment, the display 800 illustrated in FIG. 8 may be provided by a marketing system 102 as disclosed with reference to FIG. 1. The display 800 may be for a display device capable of displaying graphics. The display 800 may include an asset identifier 806 that is a graphical image associated with the asset.

The display 800 includes access platform icons 810. Each access platform icon may be associated with a particular access platform. The access platform icons 810 each include a second indicator. The second indicator is represented in FIG. 8 by the rays extending from the access platform icons 810. The second indicator is an indication of an access right that the user will have upon acceptance of the offer. The second indicator may be a color code, other indicator, or both. The second indicator may be distinct for each type of access platform. Therefore, the second indicator may be distinct for each different access platform icon 810. For example, the color code for a first icon 812 may be purple, the color code for a second icon 814 may be blue, and the color code for a third icon 816 may be orange. The second indicator may be different from a first indicator that informs the user that the asset is available for purchase, may be different from a third indicator that informs the user that the access platform associated with the access platform icon having the third indicator is not useable by the user, or both. In some embodiments, the second indicator may be the same for each type of access platform icon.

The display 800 may include price indicators 822. The price indicators 822 may show the purchase price and the list price for the asset. The display 800 also may include a time indicator 826. The time indicator 826 may indicate the length of time during which the offer is valid.

The display 800 may include a selectable purchase option 828. User selection of the purchase option 828 may be an indication of user intent to purchase the asset represented by the asset identifier 806.

Figure 9:
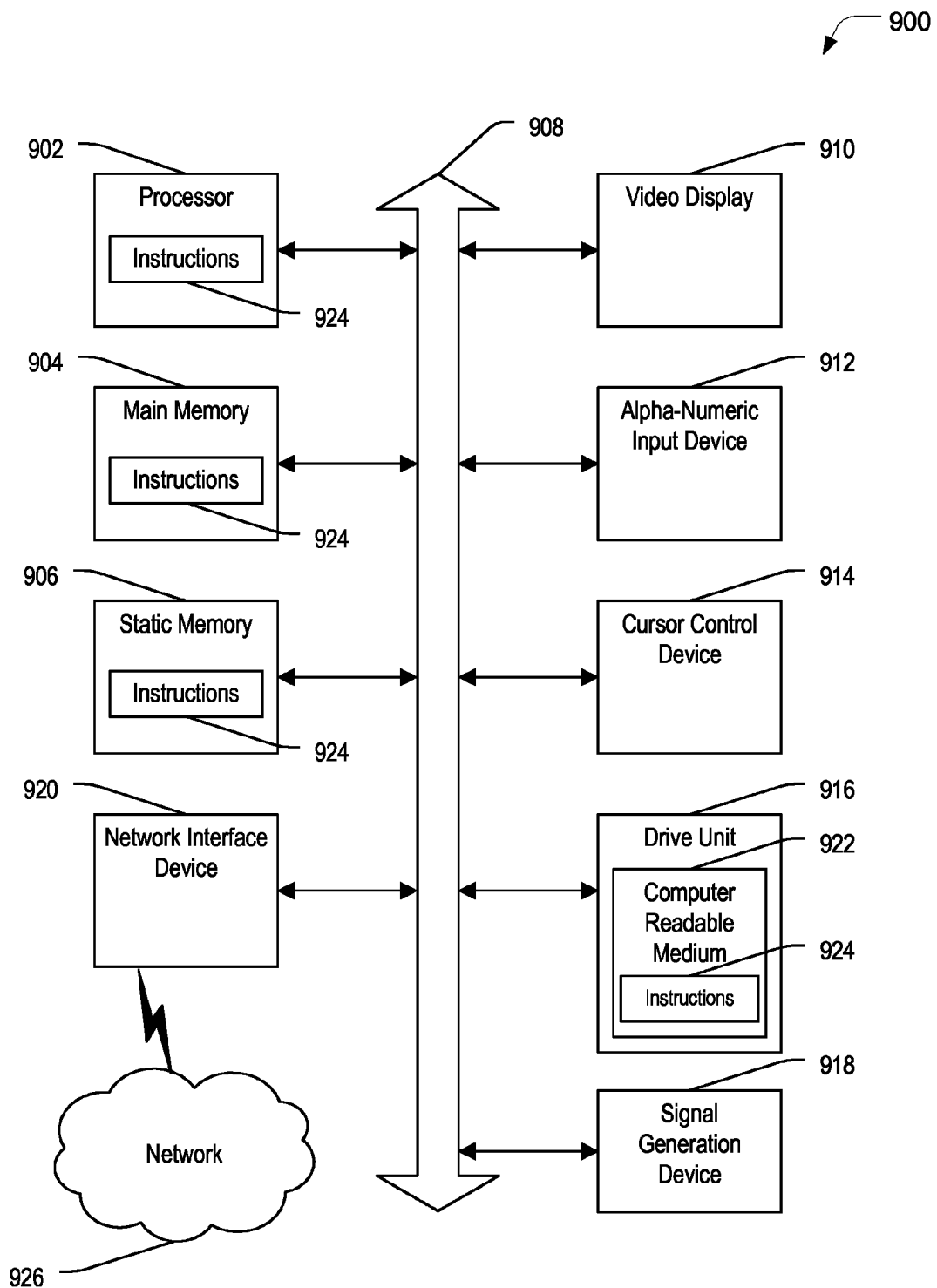
FIG. 9 is a block diagram of an illustrative embodiment of a general computer system.

Referring to FIG. 9, an illustrative embodiment of a general computer system is shown and is designated 900. The computer system 900 can include a set of instructions that can be executed to cause the computer system 900 to perform any one or more of the methods or computer based functions disclosed herein. The computer system 900, or any portion thereof, may operate as a standalone device or may be connected (e.g., using a network) to other computer systems or peripheral devices. For example and with reference to FIG. 1, the computer system 900 or portions thereof, may implement, may be included in, may include, or may be coupled through the network 104 to any of the marketing system 102, the asset database 134, the user database 144, the user devices 110-116, or combinations thereof.

In a networked deployment, the computer system may operate in the capacity of a server, such as a subscriber database, a set-top box device, a marketing system, or an order fulfillment system. The computer system 900 can also be implemented as or incorporated into various devices, such as a personal computer (PC), a tablet PC, a set-top box (STB) device, a personal digital assistant (PDA), a mobile device, a palmtop computer, a laptop computer, a desktop computer, a communications device, a wireless telephone, a land-line telephone, or any other machine capable of executing a set of instructions (sequential or otherwise) that specify actions to be taken by that machine. In a particular embodiment, the computer system 900 can be implemented using electronic devices that provide voice, video or data communication. Further, while a single computer system 900 is illustrated, the term "system" shall also be taken to include any collection of systems or sub-systems that individually or jointly execute a set, or multiple sets, of instructions to perform one or more computer functions.

As illustrated in FIG. 9, the computer system 900 may include a processor 902 (e.g., a central processing unit (CPU), a graphics-processing unit (GPU), or both). Moreover, the computer system 900 can include a main memory 904 and a static memory 906 that can communicate with each other via a bus 908. As shown, the computer system 900 may further include at least one video display unit 910, such as a liquid crystal display (LCD), an organic light emitting diode (OLED), a flat panel display, a solid-state display, or a projection display. Additionally, the computer system 900 may include an input device 912, such as a keyboard or remote control, and a cursor control device 914, such as a mouse or a touch screen. The computer system 900 can also include a disk drive unit 916, a signal generation device 918 (e.g., a speaker or light system) and a network interface device 920.

In a particular embodiment, as depicted in FIG. 9, the disk drive unit 916 may include a computer-readable medium 922 in which one or more sets of instructions 924, e.g. software, can be embedded. Further, the instructions 924 may embody one or more of the methods or logic as described herein. In a particular embodiment, the instructions 924 may reside completely, or at least partially, within the main memory 904, the static memory 906, within the processor 902, or combinations thereof during execution by the computer system 900. The main memory 904 and the processor 902 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 924 or receives and executes instructions 924 responsive to a propagated signal, so that a device connected to a network 926 can communicate voice, video or data over the network 926. Further, the instructions 924 may be transmitted or received over the network 926 via the network interface device 920.

While the computer-readable medium is shown to be a single medium, the term "computer-readable medium" includes a single medium or multiple media, such as a centralized database, distributed database, an associated cache, associated caches, a server, servers, or combinations thereof that store one or more sets of instructions. The term "computer-readable medium" shall also include any medium that is capable of storing, encoding or carrying a set of instructions for execution by a processor or that cause a computer system to perform any one or more of the methods or operations disclosed herein.

In accordance with various embodiments, the methods described herein may be implemented as one or more software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that software that implements the disclosed methods may optionally be stored on a tangible computer-readable storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. The software may also utilize a signal including computer instructions. A digital file attachment to e-mail or other self-contained information archive or set of archives is considered a distribution medium. Accordingly, the disclosure is considered to include a tangible computer-readable storage medium, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other network transmission (e.g., TCP/IP, UDP/IP, HTML, HTTP, SMPTE, MPEG, H.264, GSM, UMTS, CDMA, 1XRTT, DOCSIS) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method, comprising:
   receiving asset data associated with a plurality of assets, the asset data including platform data indicating a first plurality of access platforms of each of the assets, wherein a particular access platform of the first plurality has an ability to use a corresponding first asset;
   receiving user data associated with a user, wherein the user data includes user platform data indicating a second plurality of access platforms accessible by the user and access rights data identifying a third plurality of access platforms of each of the assets, wherein the access rights data indicates an access right to a corresponding second asset for the third plurality of access platforms;
   determining available platforms of each of the assets, wherein the available platforms of a corresponding third asset include a first access platform identified in the platform data of the corresponding third asset and in the user platform data;
   generating a display that includes an option to prohibit delivery of tangible items and, for each of the assets, information identifying the asset and an icon corresponding to an access platform of the platform data of the asset,
   wherein the icon includes a first indicator when the access platform is one of the available platforms of the asset and when the access platform is identified by the access rights data of the asset,
   wherein the icon includes a second indicator distinct from the first indicator when the access platform is one of the available platforms of the asset and when the access platform is not identified by the access rights data of the asset, and
   wherein the icon includes a third indicator distinct from the first indicator and from the second indicator when the access platform is indicated by the platform data of the asset and when the access platform is not indicated by the user platform data;
   sending the display to a display device associated with the user; and
   in response to a selection of the option to prohibit delivery of tangible items:
   removing a delivery option from the first plurality of access platforms, the second plurality of access platforms, the third plurality of access platforms, or a combination thereof; and
   updating the display to reflect the removal of the delivery option.

2. The method of claim 1, wherein the first indicator comprises a color code, and wherein the color code is different for each access platform of the platform data.

3. The method of claim 1, wherein the second indicator comprises a color code, and wherein the color code is the same for each access platform of the available platforms.

4. The method of claim 1, further comprising:
receiving a user input selecting a user selectable option that identifies a second asset of the assets when the icon of the second asset includes the first indicator and when the user data indicates that the user has a pending right to receive the second asset on the access platform corresponding to the icon of the second asset; and
sending a second display to the display device, wherein the second display includes information about accessing the second asset.

5. The method of claim 1, further comprising:
receiving a user input selecting a user selectable option that identifies a second asset of the assets when the icon of the second asset corresponds to a particular access platform included in the available platforms of the second asset that is not identified by the access rights data of the second asset; and
sending a second display to the display device, wherein the second display is an offer including a second icon corresponding to the particular access platform associated with the icon for the second asset, the second icon having the first indicator.

6. The method of claim 1, further comprising:
receiving a user input selecting a user selectable option that identifies a second asset of the assets when the icon of the second asset includes the first indicator;
determining whether the access rights data of the second asset includes an indication of a pending right to the second asset for the access platform corresponding to the icon of the second asset; and
sending a second display to the display device when there is not a pending right to the second asset for the access platform, wherein the second display comprises a warning indicator that indicates that the user has previously purchased the second asset for the access platform and wherein the second display comprises an offer including a second icon corresponding to the access platform, the second icon having the first indicator.

7. The method of claim 1, wherein the third indicator comprises a strikethrough.

8. The method of claim 1, wherein the second indicator comprises a color code.

9. The method of claim 1, further comprising:
receiving a user input selecting the icon of a second asset when the icon of the second asset has the third indicator; and
sending a second display to the display device, wherein the second display includes a user selectable add platform option that is selectable by the user to add the access platform associated with the icon of the second asset to the user platform data.

10. The method of claim 9, wherein the second display includes information regarding subscribing to a service associated with the access platform.

11. A method, comprising:
receiving asset data associated with a plurality of assets, the asset data including platform data indicating a first plurality of access platforms of each of the assets, wherein a particular access platform of the first plurality has an ability to use a corresponding first asset;
receiving user data associated with a user, wherein the user data includes user platform data indicating a second plurality of access platforms accessible by the user and access rights data identifying a third plurality of access platforms of each of the assets, wherein the access rights data indicates an access right to a corresponding second asset for the third plurality of access platforms;
generating a display that includes an option to prohibit delivery of tangible items and, for each of the assets, information identifying the asset and an icon corresponding to an access platform identified in the platform data of the asset,
wherein the icon includes a first indicator when the access platform is identified by the access rights data of the asset,
wherein the icon includes a second indicator distinct from the first indicator when the access platform is not identified by the access rights data of the asset, and
wherein the icon includes a third indicator distinct from the first indicator and distinct from the second indicator when the access platform is not indicated by the user platform data;
sending the display to a display device associated with the user; and
in response to a selection of the option to prohibit delivery of tangible items:
removing a delivery option from the first plurality of access platforms, the second plurality of access platforms, the third plurality of access platforms, or a combination thereof; and
updating the display to reflect the removal of the delivery option.

12. The method of claim 11, wherein the first indicator and the second indicator comprise color codes, wherein the first indicator associated with a first access platform is different than the first indicator associated with a second access platform when the second access platform is different than the first access platform, and wherein the color code of the second indicator is the same for each of a plurality of available platforms.

13. The method of claim 11, further comprising:
receiving a user input selecting a user selectable option that identifies a second asset of the assets when the icon of the second asset includes the first indicator;
determining whether the access rights data of the second asset indicates that the user has a pending right to the second asset for the access platform corresponding to the icon of the second asset; and
sending a second display to the display device when there is a pending right to the second asset, wherein the second display includes instructions to access the second asset.

14. The method of claim 11, wherein the icon is textual or graphical based on a graphics display capability of the display device.

15. The method of claim 14, wherein the icon is textual in response to the display device including a mobile device.

16. The method of claim 11, further comprising:
receiving a user input selecting a user selectable option that identifies a second asset of the assets when the icon of the second asset includes the first indicator;
determining whether the access rights data of the second asset includes an indication of a pending right to the second asset for the access platform corresponding to the icon of the second asset; and
sending a second display to the display device when there is not a pending right to the second asset for the access platform, wherein the second display comprises a warning indicator that indicates that the user has previously purchased the second asset for the access platform and wherein the second display comprises an offer including a second icon corresponding to the access platform, the second icon having the first indicator.

17. A computer-readable storage medium, comprising:
operational instructions that, when executed by a processor, cause the processor to identify a plurality of assets that satisfy a request of a user;
operational instructions that, when executed by the processor, cause the processor to access asset data associated with the assets, wherein the asset data includes platform data that identifies a first plurality of access platforms associated with each of the assets, wherein a particular access platform of the first plurality has an ability to use a corresponding first asset;
operational instructions that, when executed by the processor, cause the processor to access user data associated with the user, wherein the user data includes user platform data indicating a second plurality of access platforms accessible by the user, and access rights data identifying a third plurality of access platforms of each of the assets, wherein the access rights data indicates an access right to a corresponding second asset for the third plurality of access platforms;
operational instructions that, when executed by the processor, cause the processor to determine available platforms for each of the assets, wherein each of the available platforms of a corresponding third asset includes a first access platform identified in both the platform data of the corresponding third asset and the user platform data;
operational instructions that, when executed by the processor, cause the processor to send display data to generate a display at a display device, wherein the display data includes an option to prohibit delivery of tangible items and information for each of the assets identifying the asset along with an icon for each access platform in the available platforms of the asset,
wherein the icon includes a first indicator when an access platform associated with the icon is identified by the access rights data of the asset, and
wherein the icon includes a second indicator distinct from the first indicator when the access platform corresponding to the icon is not identified by the access rights data of the asset; and
operational instructions that, when executed by the processor, cause the processor in response to a selection of the option to prohibit delivery of tangible items:
removing a delivery option from the first plurality of access platforms, the second plurality of access platforms, the third plurality of access platforms, or a combination thereof; and
update the display to reflect the removal of the delivery option.

18. The computer-readable storage medium of claim 17, wherein the display for each asset comprises a fifth indicator for each access platform indicated by the platform data of the asset but not in the available platforms of the asset, and wherein the fifth indicator is distinct from the first indicator and from the second indicator.

19. A method comprising:
receiving user data that indicates access rights of each of a plurality of assets, wherein the access rights of a corresponding asset identifies a plurality of access platforms, wherein the user has an access right to the corresponding asset for the plurality of access platforms;
generating a display that includes an option to prohibit delivery of tangible items and, for each of the plurality of assets, information identifying the asset and an icon corresponding to an access platform identified by the access rights of the asset;
sending the display to a display device; and
in response to a selection of the option to prohibit delivery of tangible items:
removing a delivery option from the plurality of access platforms; and
updating the display to reflect the removal of the delivery option.

* * * * *